United States Patent
Charbit et al.

(10) Patent No.: US 9,049,666 B2
(45) Date of Patent: Jun. 2, 2015

(54) METHOD AND APPARATUS FOR PROVIDING MACHINE-TO-MACHINE COMMUNICATION IN A WIRELESS NETWORK

(75) Inventors: Gilles Charbit, Farnborough (GB); Tao Chen, Oulu (FI); Kari Juhani Rikkinen, Ii (FI)

(73) Assignee: Nokia Corporation, Espoo (FI)

(*) Notice: Subject to any disclaimer, the term of this patent is extended or adjusted under 35 U.S.C. 154(b) by 272 days.

(21) Appl. No.: 13/634,853
(22) PCT Filed: Mar. 25, 2010
(86) PCT No.: PCT/IB2010/051322
§ 371 (c)(1), (2), (4) Date: Sep. 13, 2012
(87) PCT Pub. No.: WO2011/117680
PCT Pub. Date: Sep. 29, 2011

(65) Prior Publication Data
US 2013/0012191 A1 Jan. 10, 2013

(51) Int. Cl.
H04W 72/00 (2009.01)
H04W 52/14 (2009.01)
(Continued)

(52) U.S. Cl.
CPC ............. *H04W 52/143* (2013.01); *Y02B 60/50* (2013.01);
(Continued)

(58) Field of Classification Search
CPC ..... H04W 52/40; H04W 52/12; H04W 52/08; H04W 52/241; H04W 52/146; H04W 52/143; H04W 52/16; H04W 52/242; H04W 52/10; H04W 52/346; H04W 52/283; H04W 52/325; H04W 24/00; H04W 52/04; H04W 52/06; H04W 52/367; H04W 52/34; H04W 88/08; H04W 52/243; H04W 72/0473; H04W 72/085; H04W 84/18; H04W 52/24; H04W 16/14; H04W 52/244; H04W 52/245; Y02B 60/50

USPC ............... 455/67.13, 68, 69, 127.1, 501, 522, 455/41.2, 63.3, 436, 447, 448, 450, 451, 455/452.1, 452.2, 453, 4, 54, 509, 552.1, 455/526; 370/318, 328–331

See application file for complete search history.

(56) References Cited

U.S. PATENT DOCUMENTS 6,654,614 B2 * 11/2003 Morris et al. ................. 455/522
(Continued)

FOREIGN PATENT DOCUMENTS

CN 1823278 A 8/2006
(Continued)

OTHER PUBLICATIONS

Huawei et al., "New SI Proposal: RAN Improvements for Machine-type Communications", 3GPP TSG-RAN #45, RP-090991, Agenda Item: 12, Sep. 15-18, 2009, 5 pages.
(Continued)

*Primary Examiner* — Olumide T Ajibade Akonai
(74) *Attorney, Agent, or Firm* — Mintz Levin Cohn Ferris Glovsky and Popeo, P.C.

(57) ABSTRACT

A method and apparatus are provided that may enable the provision of machine to machine (M2M) communication in a wireless network environment. In this regard, for example, relatively low power devices (specifically referencing low transmission power) such as sensors or other machines in an M2M system may be enabled to communicate with a mobile terminal via a first carrier when the power ratio between the average received machine power and the average downlink received cellular power is below a threshold value and communicate with the mobile terminal via a second carrier if the power ratio exceeds the threshold value. Thus, only one carrier may be needed by devices in such an environment in order to perform M2M communication.

12 Claims, 9 Drawing Sheets

(51) Int. Cl.

| | | |
|---|---|---|
| *H04W 16/14* | (2009.01) | |
| *H04W 52/24* | (2009.01) | |
| *H04W 52/34* | (2009.01) | |
| *H04W 52/36* | (2009.01) | |
| *H04W 72/08* | (2009.01) | |

(52) U.S. Cl.
CPC ............. *H04W 16/14* (2013.01); *H04W 52/244* (2013.01); *H04W 52/343* (2013.01); *H04W 52/146* (2013.01); *H04W 52/245* (2013.01); *H04W 52/246* (2013.01); *H04W 52/248* (2013.01); *H04W 52/367* (2013.01); *H04W 72/085* (2013.01)

(56) References Cited

U.S. PATENT DOCUMENTS

| | | | | |
|---|---|---|---|---|
| 6,904,293 | B2 * | 6/2005 | Wakizaka | 455/522 |
| 7,031,712 | B2 * | 4/2006 | Takano et al. | 455/442 |
| 7,039,410 | B2 * | 5/2006 | Jovanovic | 455/444 |
| 7,353,040 | B2 * | 4/2008 | Baker et al. | 455/522 |
| 7,599,686 | B2 * | 10/2009 | Quinn et al. | 455/423 |
| 8,290,530 | B2 * | 10/2012 | Morita et al. | 455/522 |
| 2005/0213538 | A1 * | 9/2005 | Ebiko et al. | 370/331 |
| 2008/0194281 | A1 * | 8/2008 | Sun et al. | 455/522 |
| 2010/0144338 | A1 * | 6/2010 | Kim et al. | 455/422.1 |

FOREIGN PATENT DOCUMENTS

| | | |
|---|---|---|
| CN | 101356842 A | 1/2009 |
| WO | 96/27246 A1 | 9/1996 |
| WO | 2009/009309 A1 | 1/2009 |
| WO | 2009/120125 A1 | 10/2009 |
| WO | 2009/134200 A1 | 11/2009 |
| WO | 2009/134722 A1 | 11/2009 |
| WO | 2011/086426 A1 | 7/2011 |

OTHER PUBLICATIONS

"Standardisation mandate to CEN, CENELEC and ETSI in the field of measuring instruments for the development of an open architecture for utility meters involving communication protocols enabling interoperability", M/441, European Commission, Mar. 12, 2009, pp. 1-4.

"3rd Generation Partnership Project; Technical Specification Group Radio Access Network; Evolved Universal Terrestrial Radio Access (E-UTRA) Radio Resource Control (RRC); Protocol Specification (Release 8)", 3GPP TS 36.331, V8.7.0, Sep. 2009, pp. 1-208.

"3rd Generation Partnership Project; Technical Specification Group Radio Access Network; Evolved Universal Terrestrial Radio Access (E-UTRA); User Equipment (UE) Radio Transmission and Reception (Release 8)", 3GPP TS 36.101, V8.1.0, Mar. 2008, pp. 1-43.

International Search Report and Written Opinion received for corresponding International Patent Application No. PCT/IB2010/051322, dated Dec. 16, 2010, 11 pages.

Office action received for corresponding Chinese Patent Application No. 201080065744.1, dated Jul. 25, 2014, 8 pages of office action, No English Language Translation available.

* cited by examiner

METHOD AND APPARATUS FOR PROVIDING MACHINE-TO-MACHINE COMMUNICATION IN A WIRELESS NETWORK

RELATED APPLICATION

This application was originally filed as PCT Application No. PCT/IB2010/051322 filed Mar. 25, 2010.

TECHNOLOGICAL FIELD

Embodiments of the present invention relate generally to inter-device communications technology and, more particularly, relate to an apparatus and method for providing machine-to-machine communication in a wireless network.

BACKGROUND

The modern communications era has brought about a tremendous expansion of wireline and wireless networks. Computer networks, television networks, and telephone networks are experiencing an unprecedented technological expansion, fueled by consumer demand. Wireless and mobile networking technologies have addressed related consumer demands, while providing more flexibility and immediacy of information transfer.

Machine-to-machine (M2M) communication has recently become an area of interest for its growth potential. M2M communication is also exciting to many users and developers for its potential for connecting devices for many different purposes such as smart homes, smart metering, fleet management, remote healthcare, access network operation management and numerous other uses.

M2M communication typically involves the connection of a device or group of devices to a remote server or computer system to enable remote measurement or remote reporting of information. In some cases, M2M communication involves the use of one or more sensors or other nodes or devices to gather information that can be passed to a network or computing device via some form of gateway device. Recently, mobile terminals such as cellular phones have been employed as the gateway device in order to enable remote devices or sensors to provide information to a central location or a network for processing. In some cases, the network may be the Internet or some more localized computing network.

The use of cellular communication systems in M2M applications has been advantageous due to the wide coverage areas that are currently provided by cellular communication systems. Typical endpoint devices in an M2M communication system are relatively small battery operated devices with relatively low transmission power capabilities. Thus, by interfacing with nearby mobile terminals that can connect to a cellular communication system, the endpoint devices may be able to operate at low power and still provide information to remote computing or storage devices via a mobile terminal acting as a gateway to, for example, a cellular network access point. While the connection between the gateway and the access point in such situations is provided by cellular network resources, the connection between the gateway and the endpoint device may be some other short range communication radio (e.g., short range radios employing Bluetooth, WLAN and/or the like). Thus, two radios may be required for some M2M applications. In some other applications where direct cellular communication is provided between the access point and the endpoint devices, such devices are typically not small battery operated devices, but instead are larger more powerful machines.

Accordingly, it may be desirable to provide additional alternatives to the existing M2M communication regimes.

BRIEF SUMMARY OF EXAMPLE EMBODIMENTS

A method and apparatus are therefore provided that may enable the provision of M2M communication in a wireless network environment. In this regard, for example, relatively low power devices (specifically referencing low transmission power) such as sensors or other machines in an M2M system may be enabled to communicate with a mobile terminal via a first carrier when the power ratio between the average received machine power and the average downlink received cellular power is below a threshold value and communicate with the mobile terminal via a second carrier if the power ratio exceeds the threshold value. Thus, only one carrier may be needed by devices in such an environment in order to perform M2M communication.

In one example embodiment, a method of providing machine-to-machine communication in a wireless network is provided. The method may include determining a power ratio, determining if the power ratio exceeds a threshold value, and providing for transmission of a power control command in response to the power ratio exceeding the threshold value. The power ratio may be determined using the difference in power between the average downlink received cellular power and average received machine power as measured at a mobile terminal. The method may further include providing for transmission of instructions that machine traffic transmissions and cellular traffic transmissions are to be transmitted over a single carrier in response to the power ratio not exceeding the threshold value. The power control command may be determined to be invalid in response to a recipient of the power control command failing to execute the power control command. Determining if the power ratio exceeds a threshold value may include determining if the power ratio is above a positive threshold value or below a negative threshold value. The power control command may include a command to increase a minimum allowed power in response to the power ratio being above the positive threshold value and the power control command may include a command to decrease the maximum allowed power in response to the power ratio being below a negative threshold value. The method may further include providing for transmission of instructions to offload machine traffic to a second carrier in response to the power ratio exceeding the threshold value. The method may still further include providing for transmission of instructions to offload machine traffic to a second carrier in response to receiving an indication that the power control command is invalid.

In another example embodiment, a computer program product for providing machine-to-machine communication in a wireless network is provided. The computer program product may include at least one computer-readable storage medium having computer-executable program code instructions stored therein. The computer-executable program code instructions may include program code instructions for determining a power ratio, program code instructions for determining if the power ratio exceeds a threshold value, and program code instructions for providing for transmission of a power control command in response to the power ratio exceeding the threshold value. The program code instructions for determining a power ratio may include program code instructions using the difference in power between average downlink received cellular power and average received machine power as measured at a mobile terminal. The computer program product may further include program code instructions for providing for transmission of instructions that machine traffic transmissions and cellular traffic transmissions are to be transmitted over a single carrier in response to the power ratio not exceeding a threshold value. The computer program product may further include program code instructions for receiving an indication that the power control command is invalid. The power control command may be determined to be invalid in response to a recipient of the power control command failing to execute the power control command. The program code instructions for determining if the power ratio exceeds a threshold value may include program code instructions for determining if the power ratio is above a positive threshold value or below a negative threshold value. The power control command may include a command to increase the minimum allowed power in response to the power ratio being above the positive threshold value. The power control command may include a command to decrease the maximum allowed power in response to the power ratio being below the negative threshold value. The computer program product may further include program code instructions for providing for transmission of instructions to offload machine traffic to a second carrier in response to the power ratio exceeding the threshold value. The computer program product may still further include program code instructions for providing for transmission of instructions to offload machine traffic to a second carrier in response to receiving an indication that the power control command is invalid.

In another example embodiment, an apparatus for providing machine-to-machine communication in a wireless network is provided. The apparatus may include at least one processor and at least one memory including computer program code. The at least one memory and the computer program code may be configured, with the processor, to cause the apparatus to at least determine a power ratio, determine if the power ratio exceeds a threshold value, and provide for transmission of a power control command in response to the power ratio exceeding the threshold value. The power ratio may be determined using the difference in power between the average downlink received cellular power and the average received machine power as measured at a mobile terminal. The apparatus may be further configured to provide for transmission of instructions that machine traffic transmissions and cellular traffic transmissions are to be transmitted over a single carrier in response to the power ratio not exceeding the threshold value. The apparatus may further be configured to receive an indication that the power control command is invalid, wherein the invalidity may be determined in response to a recipient of the power control command failing to execute the power control command. Determining if the power ratio exceeds a threshold value may include determining if the power ratio is above a positive threshold value or below a negative threshold value. The power control command may include a command to increase the minimum allowed power in response to the power ratio being above the positive threshold value and the power control command may include a command to decrease a maximum allowed power in response to the power ratio being below the negative threshold value. The apparatus may further be caused to provide for transmission of instructions to offload machine traffic to a second carrier in response to the power ratio exceeding the threshold value. The apparatus may still further be caused to provide for transmission of instructions to offload machine traffic to a second carrier in response to receiving an indication that the power control command is invalid.

In another example embodiment, an apparatus for providing machine-to-machine communication in a wireless network is provided. The apparatus may include at least one processor and at least one memory including computer program code. The at least one memory and the computer program code may be configured, with the processor, to cause the apparatus to at least determine an average downlink received cellular power from cellular traffic, determine average received machine power from machine traffic, calculate a power ratio corresponding to the difference between the average downlink received cellular power and the average received machine power, and determine if the power ratio exceeds a threshold value. The cellular traffic and the machine traffic may be transmitted over a first carrier in response to the power ratio not exceeding the threshold value. The machine traffic may be offloaded to a second carrier in response to the power ratio exceeding the threshold value.

In another example embodiment, a method of providing machine-to-machine communication in a wireless network is provided. The method may include determining average downlink received cellular power from cellular traffic, determining average received machine power from machine traffic, calculating a power ratio corresponding to the difference between the average downlink received cellular power and the average received machine power, and determining if the power ratio exceeds a threshold value. The method may further include providing for transmission of the cellular traffic and the machine traffic over a first carrier in response to the power ratio not exceeding the threshold value. The method may still further include providing for offloading of the machine traffic in response to the power ratio exceeding the threshold value.

In another example embodiment, a computer program product for providing machine-to-machine communication in a wireless network is provided. The computer program product may include at least one computer-readable storage medium having computer-executable program code instructions stored therein. The computer-executable program code instructions may include program code instructions for determining average downlink received power from cellular traffic, program code instructions for determining average received machine power from machine traffic, program code instructions for calculating a power ratio corresponding to the difference between the average downlink received power and the average received machine power, and program code instructions for determining if the power ratio exceeds a threshold value. The computer program product may further include program code instructions for providing for transmission of the cellular traffic and the machine traffic over a first carrier in response to the power ratio not exceeding the threshold value. The computer program product may still further include program code instructions for providing for offloading the machine traffic in response to the power ratio exceeding the threshold value.

In still another example embodiment, an apparatus is provided that includes means for determining a power ratio, means for determining if the power ratio exceeds a threshold value, and means for providing for transmission of a power control command in response to the power ratio exceeding a threshold value. The power ratio may be determined using the difference in average down link received cellular power and average received machine power as measured at a mobile terminal. The apparatus may further include means for providing for transmission of instructions that machine traffic transmissions and cellular traffic transmissions are to be transmitted over a single carrier in response to the power ratio not exceeding the threshold value. The apparatus may also include means for receiving an indication that the power control command is valid. The power control command may be determined to be invalid in response to a recipient of the power control command failing to execute the power control command. The means for determining if the power ratio exceeds a threshold value may include means for determining if the power ratio is above a positive threshold or below a negative threshold. The power control command may include a command to increase a minimum allowed power in response to the power ratio being above the positive threshold value and the power control command may include a command to decrease a maximum allowed power in response to the power ratio being below the negative threshold value. The apparatus may further include means for providing for transmission of instructions to offload machine traffic to a second carrier in response to the power ratio exceeding a threshold value. The apparatus may still further include means for providing for transmission of instructions to offload machine traffic to a second carrier in response to receiving an indication that the power control command is invalid.

BRIEF DESCRIPTION OF THE SEVERAL VIEWS OF THE DRAWING(S)

Having thus described embodiments of the invention in general terms, reference will now be made to the accompanying drawings, which are not necessarily drawn to scale, and wherein:

DETAILED DESCRIPTION

Figure 1:
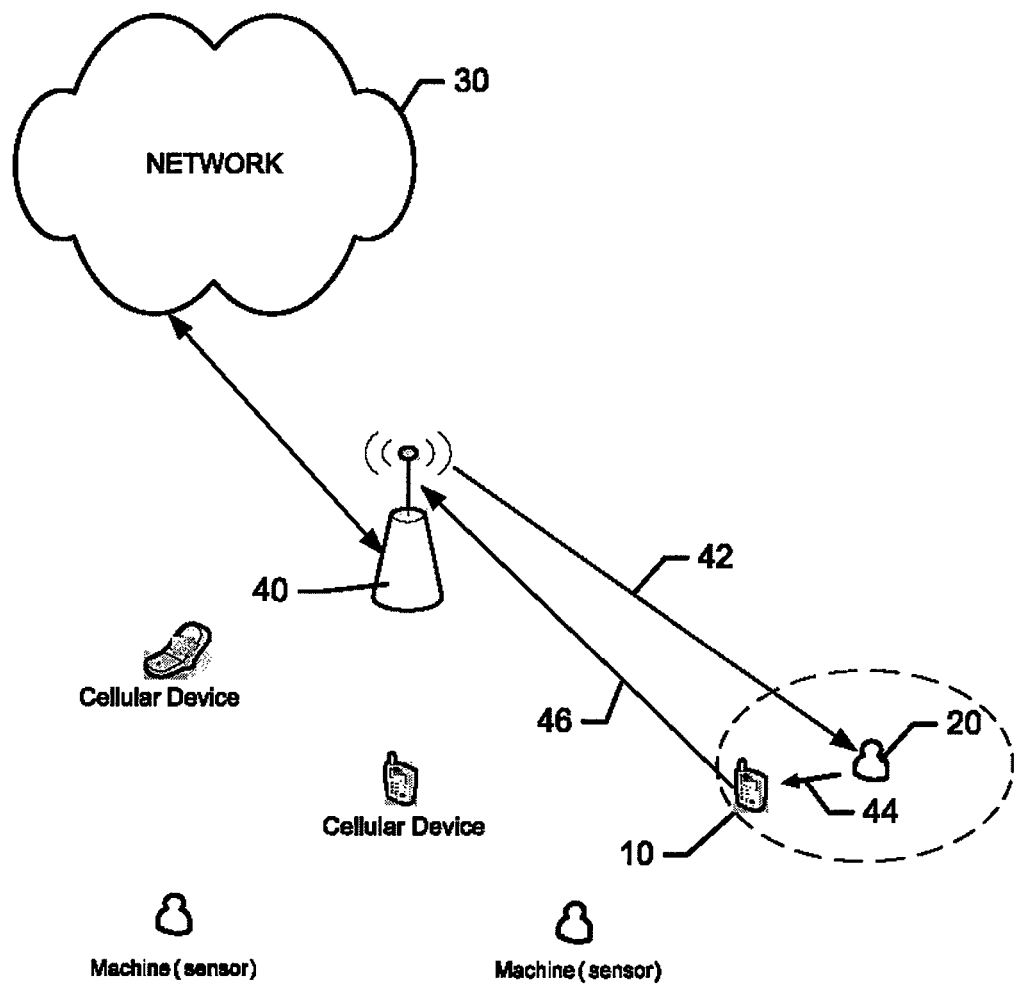
FIG. 1 illustrates one example of a communication system according to an example embodiment of the present invention.

Some embodiments of the present invention will now be described more fully hereinafter with reference to the accompanying drawings, in which some, but not all embodiments of the invention are shown. Indeed, various embodiments of the invention may be embodied in many different forms and should not be construed as limited to the embodiments set forth herein; rather, these embodiments are provided so that this disclosure will satisfy applicable legal requirements. Like reference numerals refer to like elements throughout. As used herein, the terms "data," "content," "information" and similar terms may be used interchangeably to refer to data capable of being transmitted, received and/or stored in accordance with embodiments of the present invention. Thus, use of any such terms should not be taken to limit the spirit and scope of embodiments of the present invention.

Additionally, as used herein, the term 'circuitry' refers to (a) hardware-only circuit implementations (e.g., implementations in analog circuitry and/or digital circuitry); (b) combinations of circuits and computer program product(s) comprising software and/or firmware instructions stored on one or more computer readable memories that work together to cause an apparatus to perform one or more functions described herein; and (c) circuits, such as, for example, a microprocessor(s) or a portion of a microprocessor(s), that require software or firmware for operation even if the software or firmware is not physically present. This definition of 'circuitry' applies to all uses of this term herein, including in any claims. As a further example, as used herein, the term 'circuitry' also includes an implementation comprising one or more processors and/or portion(s) thereof and accompanying software and/or firmware. As another example, the term 'circuitry' as used herein also includes, for example, a baseband integrated circuit or applications processor integrated circuit for a mobile phone or a similar integrated circuit in a server, a cellular network device, other network device, and/or other computing device.

As defined herein a "computer-readable storage medium," which refers to a physical storage medium (e.g., volatile or non-volatile memory device), can be differentiated from a "computer-readable transmission medium," which refers to an electromagnetic signal.

As indicated above, mobile terminals acting as gateway devices in an M2M communication system are often required to employ two different radios, particularly when employed with M2M communication systems involving relatively low power (e.g., low transmission power) sensors or sensor networks. Some embodiments of the present invention may provide a mechanism by which sensors or sensor networks may be allocated specific wireless network resources by the access point so that two radios are not required. In some cases, in a wireless network employing cellular network resources, the cellular network access point may allocate specific cellular network resources for communication conducted between the endpoint machine or machines (e.g., the sensors) and the access point and gateway device. For example, the access point may allocate cellular downlink channel resources for downlink direction communications from the access point to the machine(s) and between the gateway device (or relay) and the machine(s). Communications to be provided from the machine(s) to the access point may then be routed through the gateway device and the gateway device can relay those communications via cellular network uplink resources.

FIG. 1 illustrates a generic system diagram in which a device such as a mobile terminal 10, is shown in an example communication environment in which embodiments of the present invention may be employed. As shown in FIG. 1, an embodiment of a system in accordance with an example embodiment of the present invention may include a first communication device (e.g., mobile terminal 10) that may act as a relay or gateway device and one or more machines (e.g., sensor 20) capable of communication with the gateway device and perhaps also each other. In an example embodiment, the mobile terminal 10 and the sensor 20 may be in (or be capable of being placed in) communication with each other and with a network 30 via an access point 40. In some cases, embodiments of the present invention may further include one or more network devices with which the mobile terminal 10 and/or the sensor 20 may communicate to provide, request and/or receive information.

The network 30 may include a collection of various different nodes, devices or functions that may be in communication with each other via corresponding wired and/or wireless interfaces. As such, the illustration of FIG. 1 should be understood to be an example of a broad view of certain elements of the system and not an all inclusive or detailed view of the system or the network 30. One or more communication terminals such as the mobile terminal 10 and the sensor 20 may be in communication with each other via the network 30 or via device to device (D2D) communication and each may include an antenna or antennas for transmitting signals to and for receiving signals from a base site (e.g., access point 40), which could be, for example a base station that is a part of one or more cellular or mobile networks or an access point that may be coupled to a data network, such as a local area network (LAN), a metropolitan area network (MAN), and/or a wide area network (WAN), such as the Internet. In turn, other devices such as processing elements (e.g., personal computers, server computers or the like) may be coupled to the mobile terminal 10 and/or the sensor 20 via the network 30 and the access point 40. In some embodiments, the network 30 may employ one or more mobile access mechanisms such as wideband code division multiple access (W-CDMA), CDMA2000, global system for mobile communications (GSM), general packet radio service (GPRS), long term evolution (LTE), LTE Advanced and/or the like may be supported.

In some example embodiments, the mobile terminal 10 may be a mobile communication device such as, for example, a personal digital assistant (PDA), wireless telephone, mobile computing device, camera, video recorder, audio/video player, positioning device (e.g., a global positioning system (GPS) device), game device, television device, radio device, or various other like devices or combinations thereof. As such, the mobile terminal 10 may include a processor and memory for storing instructions, which when executed by the processor, cause the mobile terminal 10 to operate in a particular way or execute specific functionality. The mobile terminal 10 may also include communication circuitry and corresponding hardware/software to enable communication with other devices.

The sensor 20 may be a mobile device such as a mobile sensor or other small battery operated device configured to detect local parameters or environmental conditions for reporting to a remote location. As such, each sensor may include some form of detection device or circuitry to measure a physical parameter or other measurable value along with some communication circuitry for enabling the sensor to communicate information to the mobile terminal 10. Sensors may also include memory and processing circuitry in some instances, and the processing circuitry may direct operation of the corresponding sensors. In some cases, the sensor 20 may be replaced by some other type of machine that may be a mobile or fixed communication device. Other machines and communication devices are also shown in FIG. 1 to illustrate that one access point may serve a plurality of communication devices either employing normal cellular network communications or in a capacity as a gateway device.

As shown in FIG. 1, one or more of the machines (e.g., sensor 20) may be positioned within the coverage area of the access point 40 along with one or more other communication devices (e.g., mobile terminal 10). In general, the machines or sensors may be relatively low power communication devices (in reference to transmission power) and thus, although some machines or sensors may be within range to receive data from the access point 40, the machines or sensors may not have sufficient power to transmit to the access point. Thus, while the access point 40 may be configured to communicate directly with the sensor 20 in the downlink direction utilizing downlink channel resources as indicated by wireless link 42, the wireless link 42 may not support uplink communication. Instead, the sensor 20 may utilize communication with a gateway device (e.g., the mobile terminal 10) that is within its relatively limited communication range to provide uplink information to the access point 40. Thus, the sensor 20 may be configured to communicate with the mobile terminal 10 to provide data, information or message traffic to the mobile terminal 10 for relaying to the access point 40 via wireless link 44. The communication from the sensor 20 to the mobile terminal 10 may be provided via downlink channel resources as well. The access point 40 may designate resource blocks to be used for sensor 20 to mobile terminal 10 communication in this manner. The information provided to the mobile terminal 10 for relaying to the access point 40 may be communicated from the mobile terminal 10 to the access point 40 via uplink channel resources via wireless link 46.

Accordingly, the access point 40 (which may be a base station, e-Node B (eNB), Node B, or other type of access point) may be configured to operate both uplink and downlink channels. The access point 40 of an example embodiment is enabled to communicate with both the sensor 20 and the mobile terminal 10 in the downlink direction. However, the access point 40 of an example embodiment is enabled to communicate only with the mobile terminal 10 (or communication devices other than the sensor 20 and other machines or sensors) in the uplink direction. Moreover, as indicated above, the access point 40 of an example embodiment is configured to allocate network resources to accommodate the communications described above.

The mobile terminal 10 acting as a gateway or relay device according to an example embodiment is configured to operate using both uplink and downlink channel resources. However, with respect to communications as a relay or gateway device, the mobile terminal 10 of this example is configured to receive data from both the sensor 20 (or other machines or sensors) and the access point 40, but is only configured to send data to the access point 40.

Figure 2:
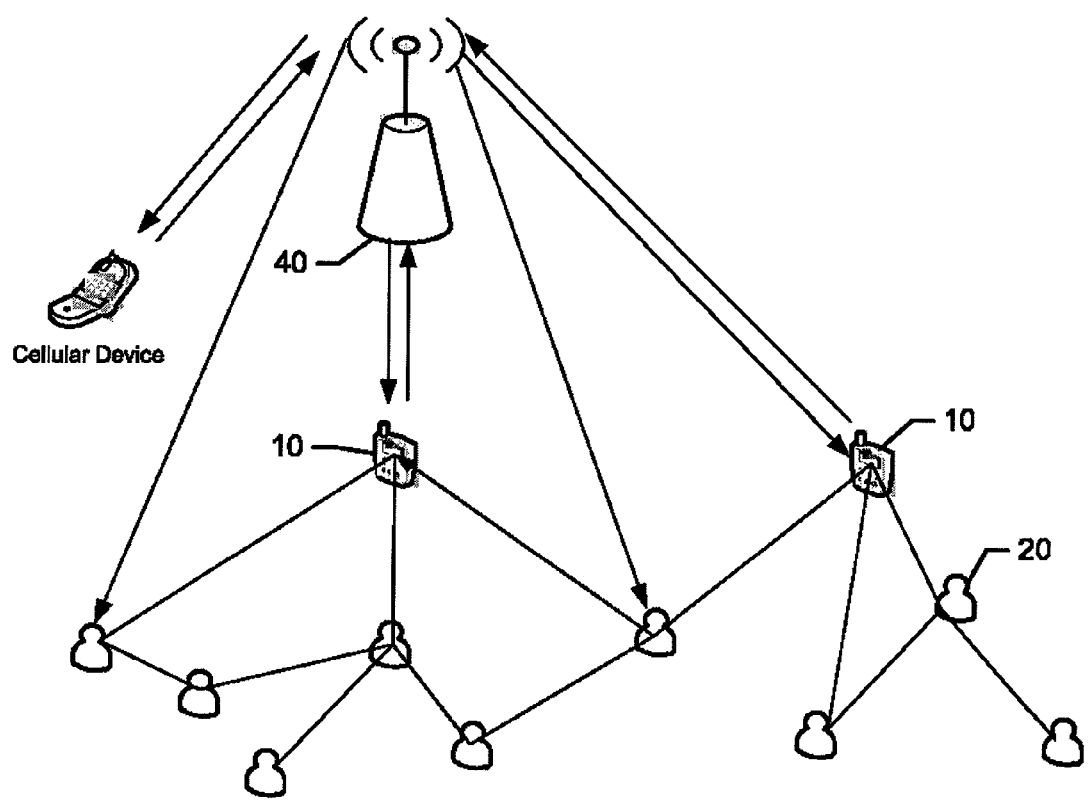
FIG. 2 illustrates an example communication system with multiple networked machines or sensors according to an example embodiment of the present invention.

Machines or sensors such as the sensor 20 that are operating in accordance with this example embodiment may be configured to operate using downlink channel resources designated by the access point. The machines or sensors may therefore send data to the mobile terminal 10 and receive signaling from the access point 40. In some embodiments, the machines or sensors may also receive signaling from other machines or sensors. FIG. 2 illustrates an example of a sensor network in which various sensors or machines (including sensor 20) are enabled to communicate with each other and, in the case of some sensors also with M2M gateway devices such as mobile terminals 10 and with the access point 40. FIG.

3 further illustrates the communication that may be provided between sensors according to an example embodiment.

Figure 3:
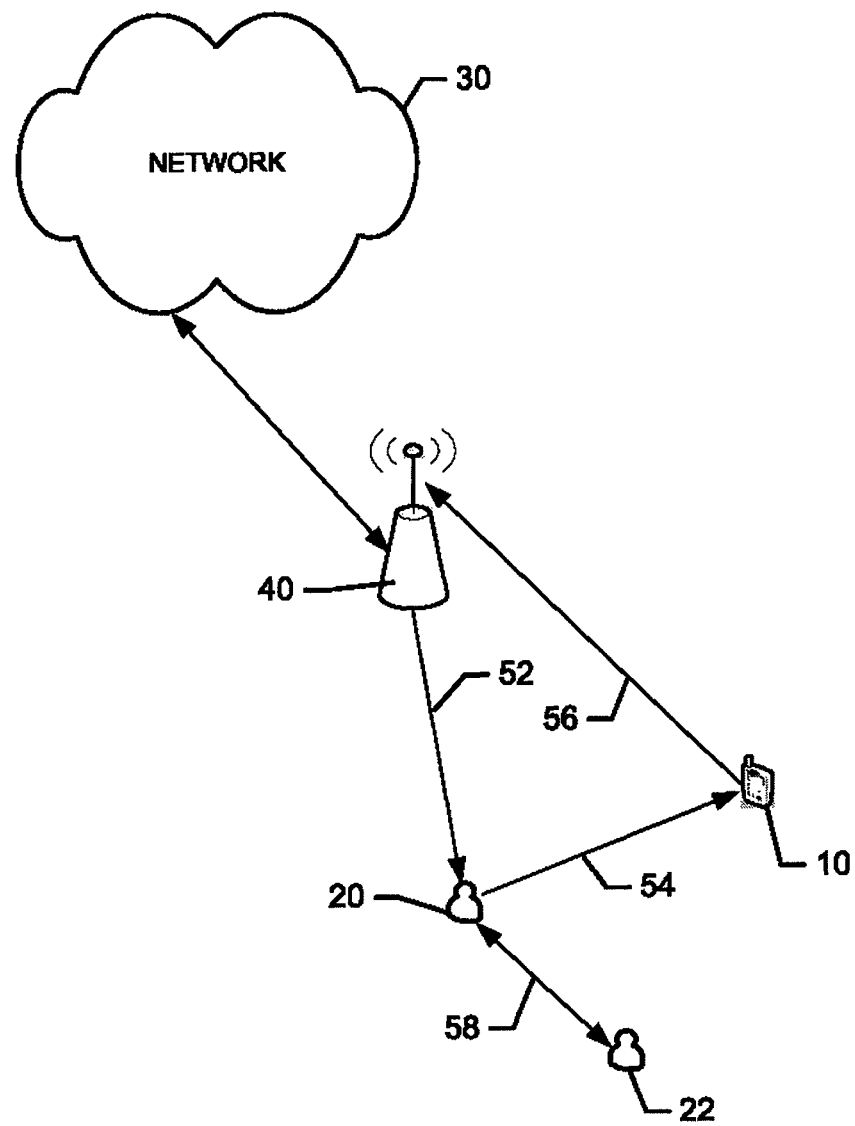
FIG. 3 illustrates another example communication system showing communication links between various entities in connection with a system for providing machine-to-machine communication in a wireless network in accordance with an example embodiment of the present invention.

As shown in FIG. 3 and described above, the access point 40 may be configured to communicate directly with the sensor 20 in the downlink direction utilizing downlink channel resources as indicated by wireless link 52. In this example, the downlink channel resources may include cellular frequency domain duplexing (FDD) downlink resources. The sensor 20 may be configured to communicate with the mobile terminal 10 to provide data, information or message traffic to the mobile terminal 10 for relaying to the access point 40 via wireless link 54. The communication from the sensor 20 to the mobile terminal 10 may be provided via downlink channel resources including cellular FDD downlink channel frequencies as well. The information provided to the mobile terminal 10 for relaying to the access point 40 may be communicated from the mobile terminal 10 to the access point 40 via uplink channel resources via wireless link 56. As such, the mobile terminal 10 may be enabled to utilize both FDD uplink and downlink resources to communicate with the access point 40. In this example embodiment, the sensor 20 may be enabled to also communicate with a node 22. The node 22 may be another sensor or machine with which the sensor 20 is capable of communicating using cellular FDD downlink frequencies operating with time domain duplexing (TDD) principles as shown by wireless link 58.

Figure 4:
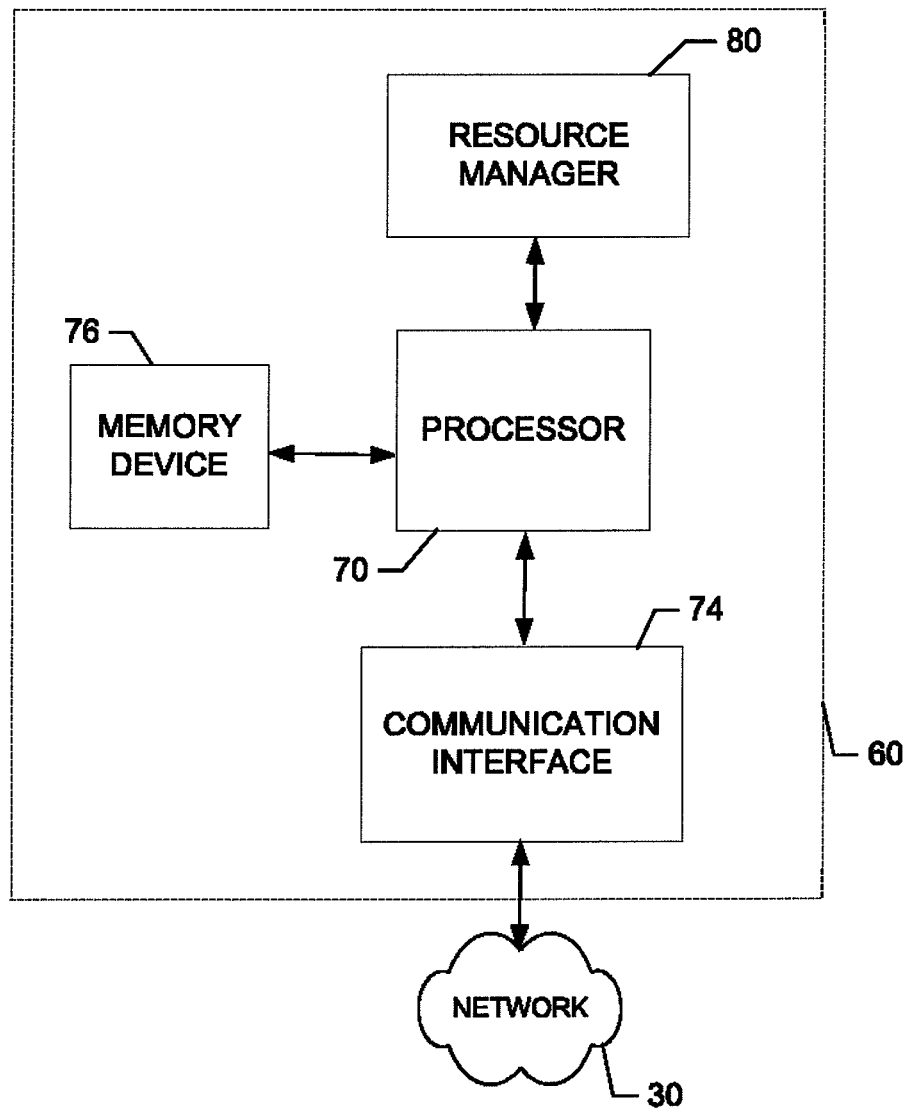
FIG. 4 illustrates a block diagram showing an apparatus for providing machine-to-machine communication in a wireless network in accordance with an example embodiment of the present invention.

In an example embodiment, the access point 40 may be configured to include or otherwise employ an apparatus according to an example embodiment of the present invention. FIG. 4 illustrates a schematic block diagram of an apparatus for providing M2M communication in a wireless network according to an example embodiment of the present invention. An example embodiment of the invention will now be described with reference to FIG. 4, in which certain elements of an apparatus 60 for providing M2M communication in a wireless network are displayed. The apparatus 60 of FIG. 4 may be employed, for example, on an access point or a variety of other devices. However, it should be noted that the components, devices or elements described below may not be mandatory and thus some may be omitted in certain embodiments. Additionally, some embodiments may include further components, devices or elements beyond those shown and described herein.

Referring now to FIG. 4, the apparatus 60 may include or otherwise be in communication with a processor 70, a communication interface 74 and a memory device 76. The memory device 76 may include, for example, one or more volatile and/or non-volatile memories. In other words, for example, the memory device 76 may be an electronic storage device (e.g., a computer readable storage medium) comprising gates configured to store data (e.g., bits) that may be retrievable by a machine (e.g., a computing device). The memory device 76 may be configured to store information, data, applications, instructions or the like for enabling the apparatus to carry out various functions in accordance with example embodiments of the present invention. For example, the memory device 76 could be configured to buffer input data for processing by the processor 70. Additionally or alternatively, the memory device 76 could be configured to store instructions for execution by the processor 70.

The processor 70 may be embodied in a number of different ways. For example, the processor 70 may be embodied as one or more of various processing means such as a coprocessor, a microprocessor, a controller, a digital signal processor (DSP), a processing element with or without an accompanying DSP, or various other processing devices including integrated circuits such as, for example, an ASIC (application specific integrated circuit), an FPGA (field programmable gate array), a microcontroller unit (MCU), a hardware accelerator, a special-purpose computer chip, or the like. In an example embodiment, the processor 70 may be configured to execute instructions stored in the memory device 76 or otherwise accessible to the processor 70. Alternatively or additionally, the processor 70 may be configured to execute hard coded functionality. As such, whether configured by hardware or software methods, or by a combination thereof, the processor 70 may represent an entity (e.g., physically embodied in circuitry) capable of performing operations according to embodiments of the present invention while configured accordingly. Thus, for example, when the processor 70 is embodied as an ASIC, FPGA or the like, the processor 70 may be specifically configured hardware for conducting the operations described herein. Alternatively, as another example, when the processor 70 is embodied as an executor of software instructions, the instructions may specifically configure the processor 70 to perform the algorithms and/or operations described herein when the instructions are executed. However, in some cases, the processor 70 may be a processor of a specific device (e.g., an eNB, AP or other network device) adapted for employing embodiments of the present invention by further configuration of the processor 70 by instructions for performing the algorithms and/or operations described herein. The processor 70 may include, among other things, a clock, an arithmetic logic unit (ALU) and logic gates configured to support operation of the processor 70.

Meanwhile, the communication interface 74 may be any means such as a device or circuitry embodied in either hardware, software, or a combination of hardware and software that is configured to receive and/or transmit data from/to a network 30 and/or any other device or module in communication with the apparatus. In this regard, the communication interface 74 may include, for example, an antenna (or multiple antennas) and supporting hardware and/or software for enabling communications with a wireless communication network. In some environments, the communication interface 74 may alternatively or also support wired communication. As such, for example, the communication interface 74 may include a communication modem and/or other hardware/software for supporting communication via cable, digital subscriber line (DSL), universal serial bus (USB) or other mechanisms.

In an example embodiment, the processor 70 may be embodied as, include or otherwise control a resource manager 80. The resource manager 80 may be any means such as a device or circuitry operating in accordance with software or otherwise embodied in hardware or a combination of hardware and software (e.g., processor 70 operating under software control, the processor 70 embodied as an ASIC or FPGA specifically configured to perform the operations described herein, or a combination thereof) thereby configuring the device or circuitry to perform the corresponding functions of the resource manager 80 as described herein. Thus, in examples in which software is employed, a device or circuitry (e.g., the processor 70 in one example) executing the software forms the structure associated with such means.

In an example embodiment, the resource manager 80 is configured to control the allocation of wireless communication resources to enable the communications described above in accordance with an example embodiment of the present invention. As such, for example, the resource manager 80 is configured to allocate resources for use by machines or sensors such as the sensor 20 to communicate directly with the access point (e.g., in the downlink direction), and/or to communicate with other machines or sensors (bi-directionally), and/or to communicate with a gateway or relay (e.g., the mobile terminal 10 for uplink to the access point 40 via the mobile terminal 10). In an example embodiment, as described above, the resource manager 80 may be configured to allocate wireless network downlink resources (e.g., cellular downlink channel resources) for use by the sensor 20 to provide signaling to other machines or sensors or to the gateway. The resource manager 80 may also be configured to allocate wireless network uplink resources (e.g., cellular uplink channel resources) to receive data from the sensor 20 via the gateway (e.g., the mobile terminal 10). Uplink and downlink resources may also be managed with respect to communications with the mobile terminal 10 for communications that are not related to data being reported by the sensor 20 or other machines or sensors.

In some cases, the resource manager 80 is enabled to configure subframes of the LTE (or other communication interface) downlink signaling structure. Furthermore, the resource manager 80 may provide information to the mobile terminal 10 and the sensor 20 (or other machines) indicating the configuration to the signaling structure so that the mobile terminal 10 and the sensor 20 may utilize the corresponding signaling structure accordingly. In an example embodiment, the resource manager 80 also provides information to the mobile terminal 10 acting as a gateway to identify the downlink resource blocks that should be monitored by the mobile terminal 10 for possible signals from the sensor 20 (or other machines). Accordingly, during situations in which the mobile terminal 10 is in the vicinity of a machine such as the sensor 20 (e.g., within the machine's communication range), and the mobile terminal 10 receives data in the identified resource downlink resource blocks, the mobile terminal 10 may forward the corresponding data to the access point 40 or send a predetermined message to the access point 40. It should be appreciated that by employing the resource allocation techniques attributable to the resource manager 80 of example embodiments of the present invention, any arbitrary mobile terminal with M2M gateway capability may be employed as a "middleman" to relay M2M communications from machines or sensors to the access point 40. Thus, for example, a device in or accessible via the network 30 may collect information from the machines or sensors for network operation and/or planning purposes. In this regard, in some cases the information collected may be indicative of the number of devices close to a particular location within a cell, or the number of devices that are able to receive a particular transmission in a specific location within the cell.

Figure 5:
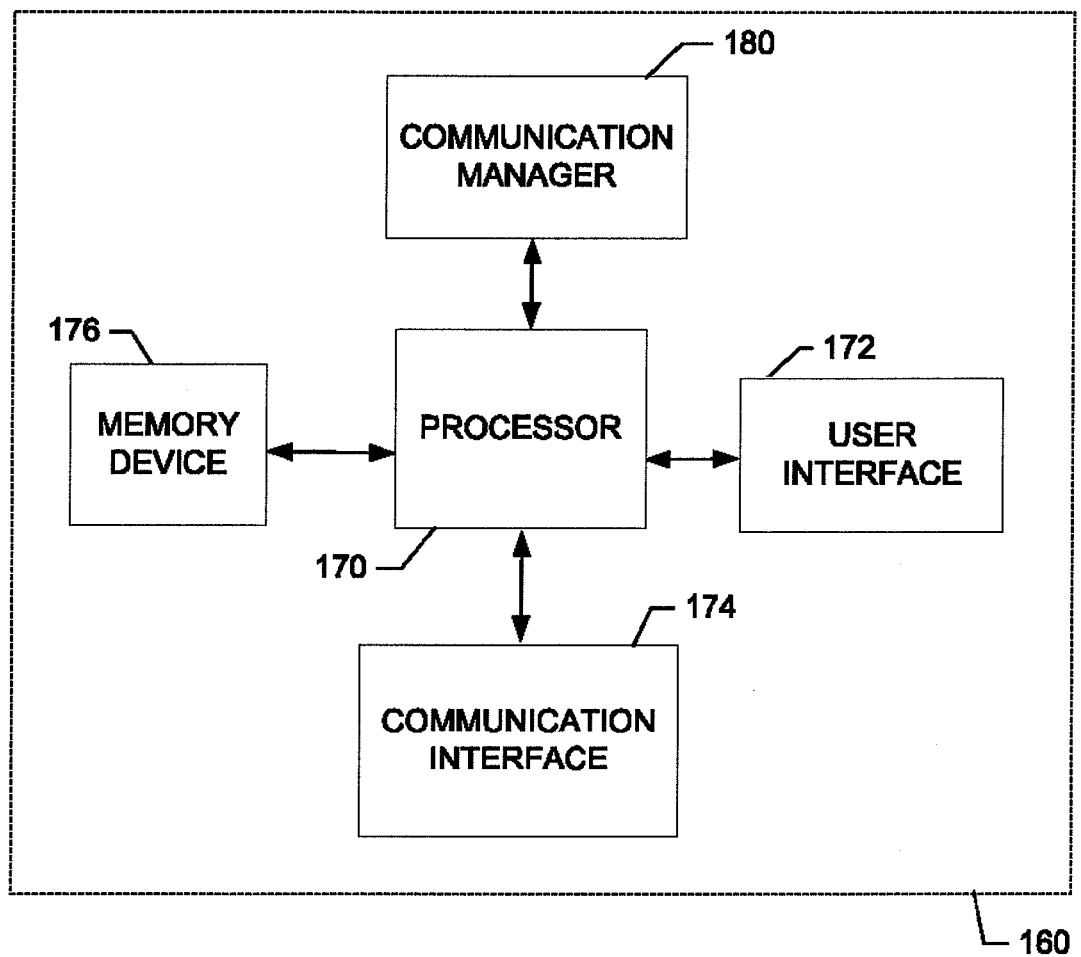
FIG. 5 illustrates a block diagram showing an apparatus for utilizing machine-to-machine communication at a gateway device in a wireless network in accordance with an example embodiment of the present invention.

FIG. 5 is a block diagram of an apparatus 160 that may be employed in connection with a gateway device (e.g., mobile terminal 10) practicing an example embodiment of the present invention. The apparatus 160 may include or otherwise be in communication with a processor 170, a user interface 172, a communication interface 174 and a memory device 176. The processor 170, the communication interface 174, and the memory device 176 may each be similar in general function and form to the processor 70, the communication interface 74 and the memory device 76 described above, so a detailed explanation of these components will not be provided. The user interface 172 may be in communication with the processor 170 to receive an indication of a user input at the user interface 172 and/or to provide an audible, visual, mechanical or other output to the user. As such, the user interface 172 may include, for example, a keyboard, a mouse, a joystick, a display, a touch screen, soft keys, a microphone, a speaker, or other input/output mechanisms. In this regard, for example, the processor 170 may comprise user interface circuitry configured to control at least some functions of one or more elements of the user interface, such as, for example, a speaker, ringer, microphone, display, and/or the like. The processor 170 and/or user interface circuitry comprising the processor 170 may be configured to control one or more functions of one or more elements of the user interface through computer program instructions (e.g., software and/or firmware) stored on a memory accessible to the processor 170 (e.g., memory device 176, and/or the like).

In an example embodiment, the processor 170 may be embodied as, include or otherwise control a communication manager 180. The communication manager 180 may be any means such as a device or circuitry operating in accordance with software or otherwise embodied in hardware or a combination of hardware and software (e.g., processor 170 operating under software control, the processor 170 embodied as an ASIC or FPGA specifically configured to perform the operations described herein, or a combination thereof) thereby configuring the device or circuitry to perform the corresponding functions of the communication manager 180 as described herein. Thus, in examples in which software is employed, a device or circuitry (e.g., the processor 170 in one example) executing the software forms the structure associated with such means. The communication manager 180 may be configured to utilize the resources allocated by the resource manager 80 above to communicate with the access point 40 and the sensor 20.

Figure 6:
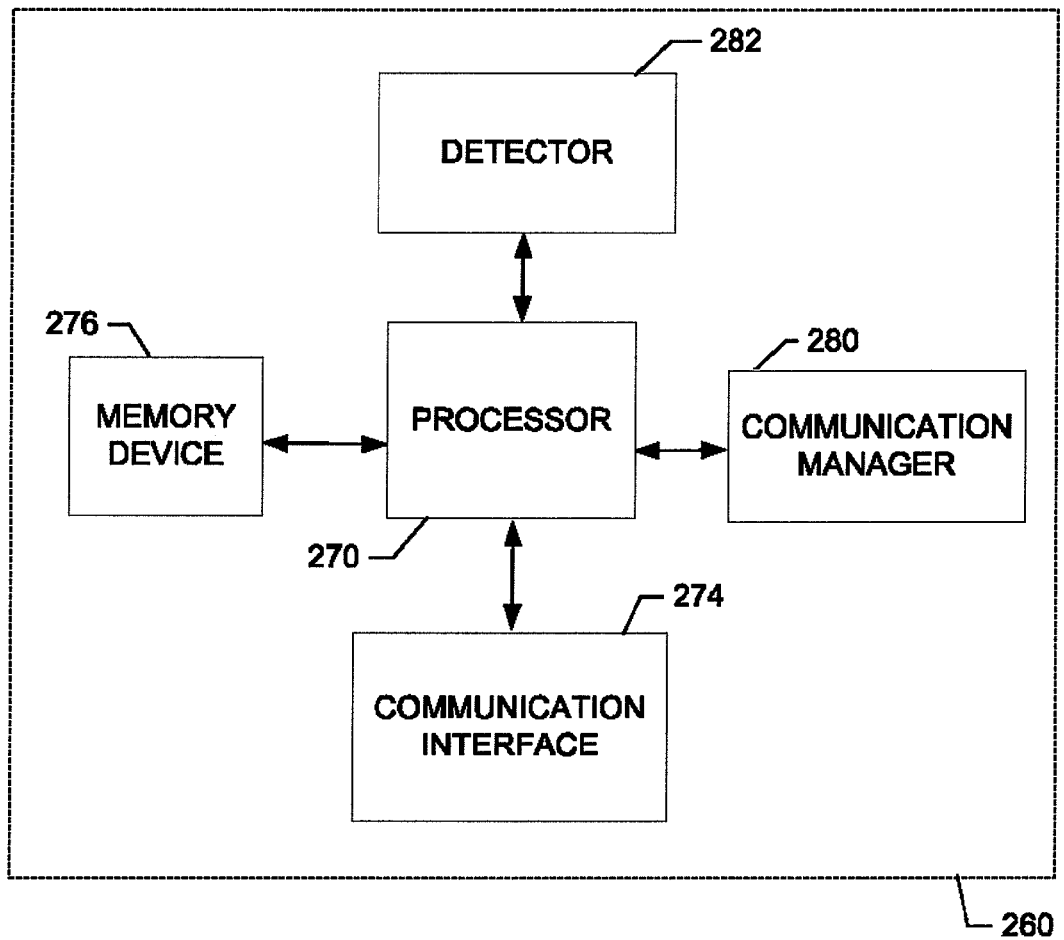
FIG. 6 illustrates a block diagram showing an apparatus for utilizing machine-to-machine communication at a machine or sensor in a wireless network in accordance with an example embodiment of the present invention.

FIG. 6 is a block diagram of an apparatus 260 that may be employed in connection with a machine or sensor (e.g., sensor 20) practicing an example embodiment of the present invention. The apparatus 260 may include or otherwise be in communication with a processor 270, a communication interface 274 and a memory device 276. The processor 270, the communication interface 274, and the memory device 276 may each be similar in general function and form to the processor 70, the communication interface 74 and the memory device 76 described above, so a detailed explanation of these components will not be provided.

In an example embodiment, the processor 270 may be embodied as, include or otherwise control a communication manager 280 and a detector 282. The communication manager 280 and the detector 282 may each be any means such as a device or circuitry operating in accordance with software or otherwise embodied in hardware or a combination of hardware and software (e.g., processor 270 operating under software control, the processor 270 embodied as an ASIC or FPGA specifically configured to perform the operations described herein, or a combination thereof) thereby configuring the device or circuitry to perform the corresponding functions of the communication manager 280 and the detector 282, respectively, as described herein. Thus, in examples in which software is employed, a device or circuitry (e.g., the processor 270 in one example) executing the software forms the structure associated with such means. The communication manager 280 may be configured to utilize the resources allocated by the resource manager 80 above to communicate with the access point 40 and the mobile terminal 10. The detector 282 may be configured to detect some parameter or information for reporting to a remote device via the mobile terminal 10 and the access point 40.

In an example embodiment, the communication manager 280 may be configured to perform at least receiving direct downlink communication from the access point 40 to the sensor 20, receiving (e.g., via the direct downlink communication) an indication of wireless network resources usable for provision of uplink data indirectly to the access point 40 via a mobile gateway device (e.g., the mobile terminal 10), and providing the uplink data to the mobile gateway device using the wireless network resources indicated.

Figure 7:
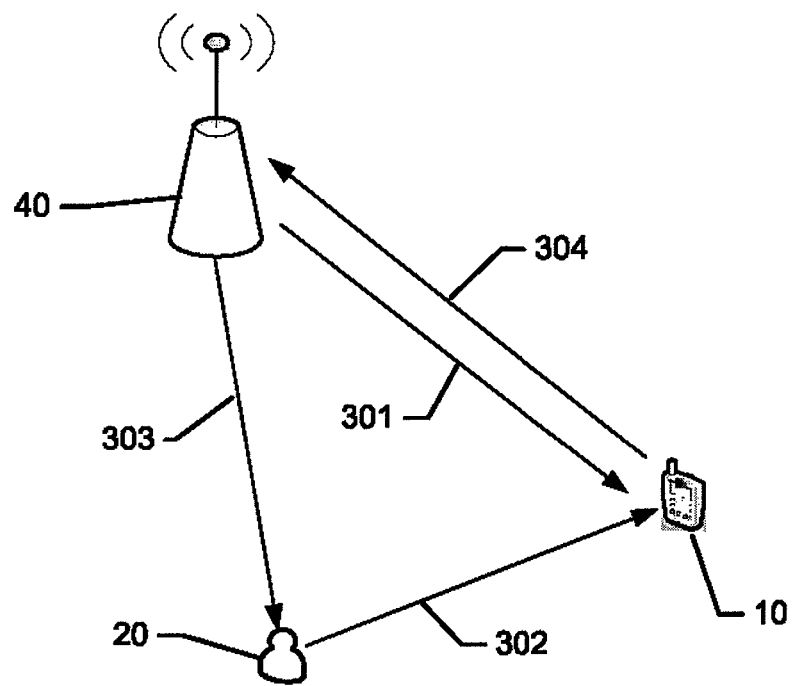
FIG. 7 illustrates an example communication system with communication links between various entities in connection with a system for providing machine-to-machine communication in a wireless network in accordance with an example embodiment of the present invention.

In an example embodiment of the present invention illustrated in FIG. 7, the access point 40 (e.g., an eNB) may schedule downlink cellular traffic to the mobile terminal 10 on a first data link carrier 301 that may be a carrier typically used for wide area coverage (e.g. macro/micro eNB) and offload machine traffic to the mobile terminal 10 on a second data link carrier 302 that may be a carrier typically used for local area coverage (e.g., Home eNB, Pico eNB). By way of example, the first data link carrier 310 may be a conventional cellular FDD downlink while the second data link carrier 302 may be TDD using a cellular FDD downlink frequency. The machine traffic may be offloaded to the second data link carrier 302 if, for example, simultaneous cellular data and machine data need to be received at the mobile terminal 10 with a large power ratio difference observed between them (e.g., greater than 10-15 dB). The access point 40 may communicate to the sensor 20 via a conventional cellular FDD downlink control link 303 and the mobile terminal 10 may communicate to the access point 40 via conventional cellular FDD uplink control link 304. As noted above, the sensor 20 may not be capable of sufficient transmission power to send data directly to the access point 40. In the embodiment depicted in FIG. 7, the mobile terminal 10 may act as a gateway for the sensor 20 by determining the average downlink received cellular power via the first data link carrier 301 and average received machine power from the sensor 20 via the second data link carrier 302 and compute the power ratio corresponding to the difference. Determining the average received machine power and the average downlink received cellular power may include measuring or looking up the values, or receiving the values from another device which may, for example, perform the measurement. If the power ratio between the average downlink received cellular power and the received machine power is relatively small, the mobile terminal 10 may allow simultaneous reception of downlink cellular data and machine data via the first carrier, for example on the same subframe on different physical resource blocks (PRB). If the power ratio difference is relatively large, simultaneous reception of downlink cellular data and machine data may be impractical or undesirable and while the downlink cellular data is maintained on a first carrier, the machine data may be offloaded to a second carrier.

In the aforementioned embodiment, machine traffic offload may be based on the mobile terminal neighbor cell measurements as reported in a neighbor list where the second data link carrier corresponds to the weakest cell or "unseen" cell. This inverted logic from that often used in inter-carrier handovers where the carrier corresponding to the best cell is chosen may be implemented to minimize interference of the machine data transmissions with the mobile terminal data transmissions. The mobile terminal may be constantly searching for neighbor cells such that, for mobility, the mobile terminal may be handed over from one cell to a neighboring cell when necessary. Thus, the mobile terminal may maintain a neighbor cells list including the cells heard, their levels, timings, as well as how recently the neighboring cell was heard. The access point may select a carrier for machine traffic offloading based on the neighboring cell list including using possible selection criteria of whether the cell was received strongly by the mobile terminal based on mobility measurements and how recently the cell was heard. Selection of the second carrier may be based on minimizing the likelihood of machine interference. The access point may help to minimize inter-machine interference by allocating orthogonal machine-specific resources in frequency (PRB separated), time (subframe separated), or distance separated (if machine location is known).

Figure 8:
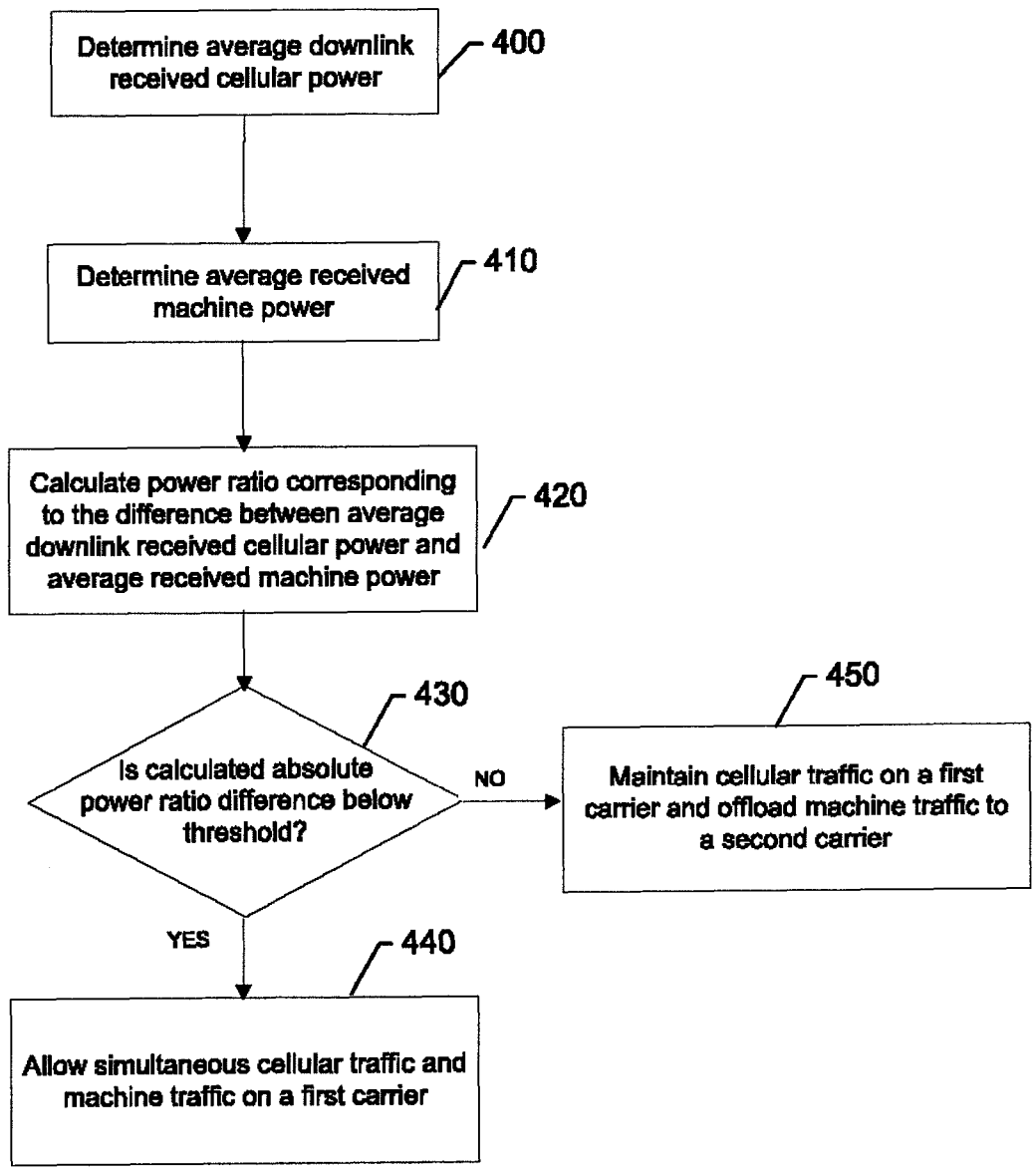
FIG. 8 illustrates a flowchart of a method of providing machine-to-machine communication in a wireless network according to an example embodiment of the present invention.

FIG. 8 illustrates a flowchart diagram showing the operation of a mobile terminal or portion thereof according to the example embodiment described above. At operation 400, the mobile terminal may determine average downlink received cellular power received, such as by measurement. At operation 410, the mobile terminal may determine the average received machine power which may be measured by the mobile terminal. The power ratio corresponding to the difference between the average downlink received cellular power and the average received machine power is calculated at 420 and if the power ratio is below a threshold value at 430, simultaneous reception of downlink cellular data and machine data via a single carrier may be allowed at 440, for example on the same subframe on different physical resource blocks. If the calculated power ratio is above the threshold at 430, simultaneous reception of downlink cellular data and machine data via a single carrier is disallowed at operation 450 and the machine traffic is offloaded to a second carrier.

Another example embodiment of the present invention using a mobile terminal 10 as a gateway is described with reference again to FIG. 7. The mobile terminal 10 may report downlink cellular received power and average machine received power or the power ratio to the access point 40, for example as a feedback signal. The access point 40 may then determine if the power ratio corresponding to the difference between the average downlink received cellular power and the average received machine power is above the aforementioned threshold. The access point may include means for determining the power ratio such as processor 70, which may also be the means for determining if the power ratio exceeds a threshold value. If the ratio is above the threshold, the access point 40 may send a power control command to the sensor 20 directing the sensor 20 to increase or reduce its power within the capabilities of the sensor in order to reduce the power ratio below the threshold. The access point may include means for providing for transmission of the power control command, such as the communications interface 74. If the power ratio is below the threshold, or once the access point 40 control signal causes the machine power to adjust such that the power ratio is below the threshold, simultaneous cellular signal reception and/or transmission and machine signal reception and/or transmission may occur via a single carrier. If the access point 40 cannot cause the machine power from the sensor 20 to be adjusted such that the power ratio is below the threshold (e.g., the machine has insufficient power headroom or the machine power would drop below the minimum sensitivity level of the mobile terminal), the access point 40 may cause the machine transmission to be offloaded or scheduled on a second carrier. Further, the machine transmission and the cellular transmission for the mobile terminal 10 may be scheduled in non-adjacent carriers, separately for a greater separation in frequency domain of the transmissions.

A power control command from the access point may be triggered by an event or a warning of an imminent event, such as when a mobile terminal 10 recognizes that the power ratio corresponding to the difference between the average received machine power and the average received downlink cellular power is exceeding, or is close to exceeding the threshold that allows the downlink cellular data and the machine data to be transmitted on the same carrier. An example threshold power difference may be around 10 dB to 15 dB. If the power ratio exceeds the threshold, then the access point 40 (e.g., eNB) may send the power control command that requires the sensor 20 to adjust its allowed minimum power up assuming that the machine power headroom allows such an increase. If the power ratio was below the threshold value, then no such power command would be required. If the power ratio was below the negative threshold level (e.g., −10 dB to −15 dB), then the access point 40 may send a power control command to the sensor 20 to adjust the allowed maximum power down assuming the sensor signal received at the mobile terminal 10 remains above the minimum sensitivity level.

Figure 9:
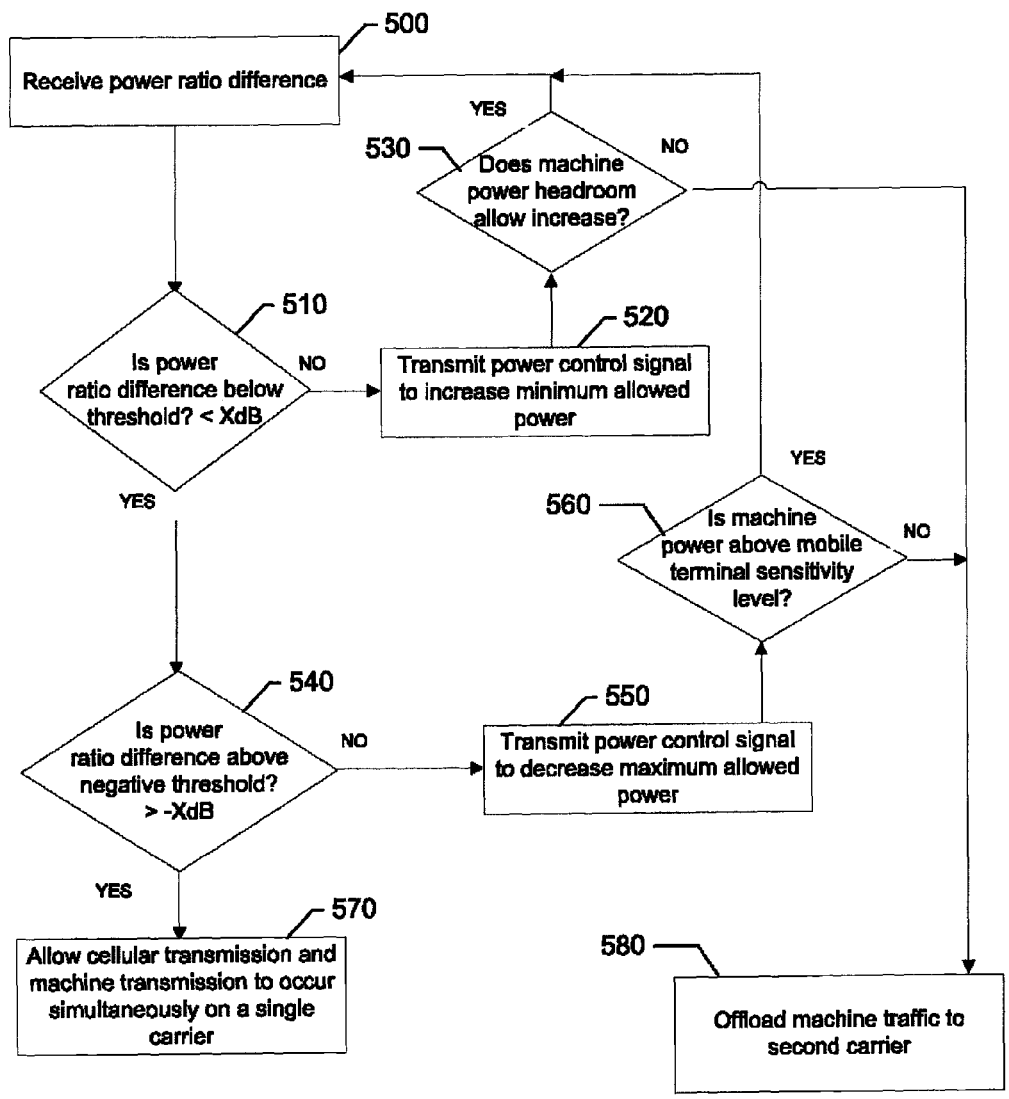
FIG. 9 illustrates a flowchart of a method of providing machine-to-machine communication in a wireless network in accordance with another example embodiment of the present invention.

FIG. 9 illustrates a flowchart diagram showing the operation of an access point or portion thereof according to the example embodiment described above. An access point (e.g., access point 40) receives an absolute power ratio difference from a mobile terminal (e.g., mobile terminal 10) at operation 500. Optionally, the access point may receive the measured downlink received cellular power and measured machine power and calculate the power ratio at 500. The access point then determines if the power ratio difference is below a threshold value at operation 510. If the power ratio difference is above the threshold, the access point transmits a power control command to a machine (e.g., sensor 20) to increase the minimum allowed power at 520. The access point may include means for providing for transmission of the power control command, such as communication interface 74. A determination is made at 530 whether or not the machine power headroom would allow the increase commanded at 520. The determination may be made by the machine itself based on the commanded power or by the access point if the access point is aware of the machine power headroom prior to issuing the command. A signal or indication that the power control command is invalid may be received by the access point through means such as the communications interface 74. If the machine power headroom allows the increase, the machine executes the commanded power control and the cycle begins again with the access point receiving the absolute power ratio difference from the mobile terminal at 500. If the machine power headroom does not allow the commanded power increase at 530, the machine traffic is offloaded to a second carrier at operation 580. Alternatively, if the power ratio is below the threshold at 510, a determination is then made as to whether the power ratio is above the negative threshold at 540, for example by means such as processor 70. If the power ratio difference is below the negative threshold, the access point transmits a power control command to decrease the maximum allowed power at 550. A determination is then made at 560 as to whether the machine power is above the mobile terminal sensitivity level at 560 after the decrease in maximum allowed power commanded by the access point at 550. The determination may be made by the machine itself based on the commanded power or by the access point if the access point is aware of the minimum mobile terminal sensitivity level. The access point or machine may also query the mobile device to determine the mobile terminal sensitivity level. If the machine power is above the mobile terminal sensitivity level, the access point then receives again the power ratio at 510 and the cycle begins again. If the power control command would cause the machine power to be reduced below the mobile terminal sensitivity level at 560, then machine traffic is offloaded to a second carrier at 580. Alternatively, if the power ratio is above the negative threshold at 540, cellular transmission between the access point and the mobile terminal and machine transmission between the mobile terminal and the machine are allowed to occur simultaneously on a single carrier at 570.

When the cellular transmission and the machine transmission are simultaneously occurring on a first carrier, the transmissions may be PRB-separated as scheduled by the access point 40 or the mobile terminal 10 to allow simultaneous machine and cellular signal reception and/or transmission at the mobile terminal that is acting as the machine gateway for M2M communication. With the absolute power ratio difference within the allowed range (e.g., above −X dB and below X dB, where X may be between 10 dB and 15 dB), the inband emissions or PRB leakage may remain within the specified requirements given practical transmitter implementation for phase noise and downlink carrier synchronization error.

When the absolute power ratio difference exceeds the threshold and a second carrier is required to offload machine traffic, the first and second carriers may be sufficiently separated to allow a duplexing filter to decouple the transmissions to prevent cellular-to-machine interference or machine-to-cellular interference. If the first and second carriers are adjacent (adjacent bands) or relatively close (non-adjacent bands), the machine power control may be further used to limit inter-carrier interference by keeping the power ratio difference sufficiently small which may allow more practical filtering designs and reduce the implementation cost.

The network may be configured to divide the carriers into subsets of carriers, such as for example, macro/micro eNBs (e.g., wide area coverage) and another subset of carriers, for example HeNBs and pico eNBs (e.g., local area coverage). This may allow a more straightforward selection of a second carrier for machine traffic offloading. The network may further be configured to allow selection of the best second carrier that is least likely to create interference as the eNB may allocate orthogonal machine-specific resources in frequency (PRB separated), time (subframe separated), or distance separated (if the machine location is known).

Since the allocation of resources in some embodiments is coordinated by the resource manager 80 of the access point 40, inter device interference may be reduced. Furthermore, in some embodiments, the M2M machine (e.g., the sensor 20) and the M2M gateway (e.g., the mobile terminal 10) may be synchronized to the same access point. Since the mobile terminal 10 in such cases is assumed to be within the relatively low power range of the sensor 20, the propagation delay may be assumed to be well within a cyclic prefix length. As such, for example, assuming a typical sensor range of 100 meters or less, the maximum propagation delay would be expected to be around 33 microseconds. This may provide for transmission times of the sensor 20 to the mobile terminal 10 on an LTE TDD uplink resource to be sufficiently aligned at the receiver window of the mobile terminal 10.

Accordingly, embodiments of the present invention may provide for relatively small changes to the normal wireless operation of the gateway device and access point in order to support flexible M2M system employment. Thus, for example, automatic data collection systems or wide area sensor systems may be employed via collaboration with nearby cellular network devices. Additionally, the use of one radio interface (instead of requiring two radios) for all communications within the system simplifies the system while still keeping power levels for sensor devices low and battery lives long. Furthermore, by simplifying the integration of devices and communication interfaces, standardization of communications between devices may be simplified as well.

FIGS. 8 and 9 are flowcharts of systems, methods and program products according to example embodiments of the invention. It will be understood that each block of the flowcharts, and combinations of blocks in the flowcharts, may be implemented by various means, such as hardware, firmware, processor, circuitry and/or other device associated with execution of software including one or more computer program instructions. For example, one or more of the procedures described above may be embodied by computer program instructions. In this regard, the computer program instructions which embody the procedures described above may be stored by a memory device of an apparatus employing an embodiment of the present invention and executed by a processor in the apparatus. As will be appreciated, any such computer program instructions may be loaded onto a computer or other programmable apparatus (e.g., hardware) to produce a machine, such that the resulting computer or other programmable apparatus embody means for implementing the functions specified in the flowchart block(s). These computer program instructions may also be stored in a computer-readable memory that may direct a computer or other programmable apparatus to function in a particular manner, such that the instructions stored in the computer-readable memory produce an article of manufacture the execution of which implements the function specified in the flowchart block(s). The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowchart block(s).

Accordingly, blocks of the flowcharts support combinations of means for performing the specified functions, combinations of operations for performing the specified functions and program instruction means for performing the specified functions. It will also be understood that one or more blocks of the flowchart, and combinations of blocks in the flowcharts, can be implemented by special purpose hardware-based computer systems which perform the specified functions, or combinations of special purpose hardware and computer instructions.

In an example embodiment, an apparatus for performing the methods of FIGS. 8 and 9 above may comprise a processor (e.g., the processor 70) configured to perform some or each of the operations (400-450 and 500-580) described above. The processor may, for example, be configured to perform the operations (400-450 and 500-580) by performing hardware implemented logical functions, executing stored instructions, or executing algorithms for performing each of the operations. Alternatively, the apparatus may comprise means for performing each of the operations described above. In this regard, according to an example embodiment, examples of means for performing operations 400-450 and 500-580 may comprise, for example, the processor 70, the resource manager 80, and/or a device or circuit for executing instructions or executing an algorithm for processing information as described above.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

What is claimed is:

1. An apparatus comprising at least one processor and at least one memory including computer program code, the at least one memory and the computer program code configured to, with the processor, cause the apparatus to at least:
   determine a power ratio;
   determine if the power ratio exceeds a threshold value;
   provide for transmission of a power control command in response to the power ratio exceeding the threshold value;
   provide for transmission of a first instruction to enable an offload of a machine traffic to a second carrier, when the power ratio exceeds the threshold value; and
   provide for transmission of a second instruction to enable the machine traffic and a cellular traffic to be transmitted over a single carrier, when the power ratio does not exceed the threshold value.

2. The apparatus according to claim 1, wherein the power ratio is determined using a difference in power between average downlink received cellular power and average received machine power as measured at a mobile terminal.

3. The apparatus according to claim 1, wherein the memory and computer program code are configured to, with the processor, cause the apparatus to further receive an indication that the power control command is invalid.

4. The apparatus according to claim 1, wherein the power control command includes at least one of a first command to increase a minimum allowed power in response to the power ratio being above a positive threshold value or a second command to decrease a maximum allowed power in response to the power ratio being below a negative threshold value.

5. An apparatus comprising at least one processor and at least one memory including computer program code, the at least one memory and the computer program code configured to, with the processor, cause the apparatus to at least:
   determine a power ratio;
   determine if the power ratio exceeds a threshold value;
   provide for transmission of a power control command in response to the power ratio exceeding the threshold value;
   receive an indication that the power control command is invalid;
   provide for transmission of at least one instruction to offload machine traffic to a second carrier in response to receiving an indication that the power control command is invalid.

6. A method comprising:
   determining a power ratio;
   determining if the power ratio exceeds a threshold value;
   providing for transmission of a power control command in response to the power ratio exceeding the threshold value;
   provide for transmission of a first instruction to enable an offload of a machine traffic to a second carrier, when the power ratio exceeds the threshold value; and
   provide for transmission of a second instruction to enable the machine traffic and a cellular traffic to be transmitted over a single carrier, when the power ratio does not exceed the threshold value.

7. The method according to claim 6, wherein the power ratio is determined using a difference in power between average downlink received cellular power and average received machine power as measured at a mobile terminal.

8. The method according to claim 6, wherein the power control command includes at least one of a first command to increase a minimum allowed power in response to the power ratio being above a positive threshold value or a second command to decrease the maximum allowed power in response to the power ratio being below a negative threshold value.

9. A non-transitory computer-readable storage medium including computer program code which when executed by at least one processor causes operations comprising:
   determining a power ratio;
   determining if the power ratio exceeds a threshold value;
   providing for transmission of a power control command in response to the power ratio exceeding the threshold value;
   providing for transmission of a first instruction to enable an offload of a machine traffic to a second carrier, when the power ratio exceeds the threshold value; and
   providing for transmission of a second instruction to enable the machine traffic and a cellular traffic to be transmitted over a single carrier, when the power ratio does not exceed the threshold value.

10. An apparatus comprising at least one processor and at least one memory including computer program code, the at least one memory and the computer program code configured to, with the processor, cause the apparatus to at least:
    determine average downlink received cellular power from cellular traffic;
    determine average received machine power from machine traffic;
    calculate a power ratio corresponding to a difference between the average downlink received cellular power and the average received machine power;
    determine if the power ratio exceeds a threshold value;
    allow offload of the machine traffic to a second carrier, when the power ratio exceeds the threshold value; and
    allow the machine traffic and the cellular traffic to be transmitted over a single carrier, when the power ratio does not exceed the threshold value.

11. A method comprising:
    determining average downlink received cellular power from cellular traffic;
    determining average received machine power from machine traffic;
    calculating a power ratio corresponding to a difference between the average downlink received cellular power and the average received machine power;
    determining if the power ratio exceeds a threshold value;
    allowing offload of the machine traffic to a second carrier, when the power ratio exceeds the threshold value; and
    allowing the machine traffic and the cellular traffic to be transmitted over a single carrier, when the power ratio does not exceed the threshold value.

12. A non-transitory computer-readable storage medium including computer program code which when executed by at least one processor causes operations-comprising:
    determining average downlink received cellular power from cellular traffic;
    determining average received machine power from machine traffic;
    calculating a power ratio corresponding to a difference between the average downlink received cellular power and the average received machine power; and
    determining if the power ratio exceeds a threshold value;
    allowing offload of the machine traffic to a second carrier, when the power ratio exceeds the threshold value; and
    allowing the machine traffic and the cellular traffic to be transmitted over a single carrier, when the power ratio does not exceed the threshold value.

* * * * *